April 6, 1943.     B. DICK     2,315,944
SEALING MEANS FOR PISTONS
Filed March 29, 1940     2 Sheets-Sheet 1
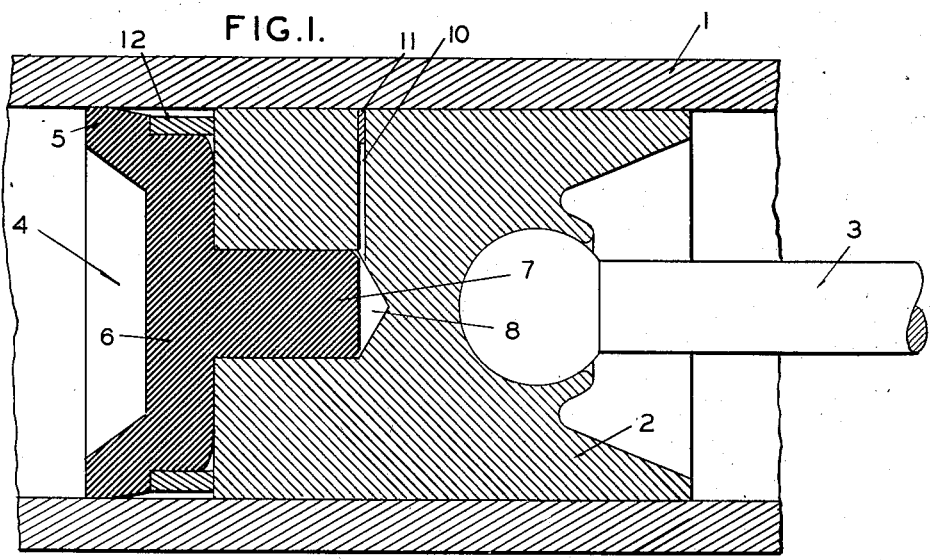
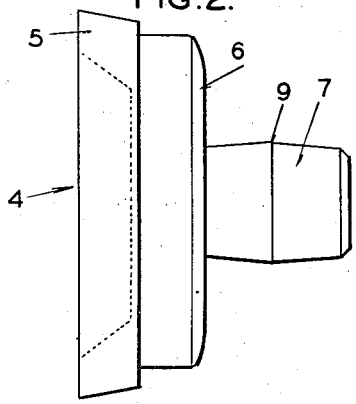
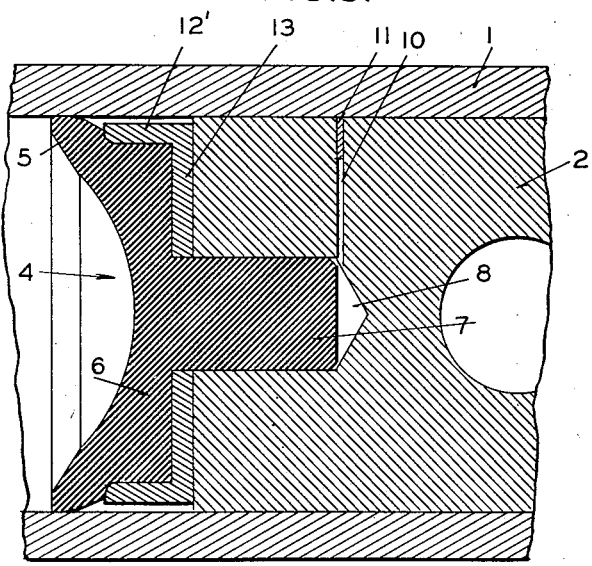
INVENTOR
BURNS DICK
BY
ATTORNEY April 6, 1943.　　　　B. DICK　　　　2,315,944
SEALING MEANS FOR PISTONS
Filed March 29, 1940　　　2 Sheets-Sheet 2

INVENTOR
BURNS DICK
BY
ATTORNEY

Patented Apr. 6, 1943

2,315,944

UNITED STATES PATENT OFFICE 2,315,944

SEALING MEANS FOR PISTONS

Burns Dick, Ferguson, Mo., assignor to Wagner Electric Corporation, St. Louis, Mo., a corporation of Delaware Application March 29, 1940, Serial No. 326,545

6 Claims. (Cl. 309—33)

My invention relates to sealing means for preventing fluid under pressure from passing between a relatively movable piston and cylinder.

One of the objects of my invention is to provide an improved sealing means having minimum friction with the cylinder wall.

Another object of my invention is to provide a sealing means comprising an expansible ring of material having a relatively low coefficient of friction and a yieldable member within the ring for expanding it when subjected to fluid pressure.

Still another object of my invention is to provide a sealing cup made of yieldable material, such as rubber, synthetic rubber or the like, with means for minimizing the friction and consequently the wear between it and the cylinder wall when subjected to fluid pressure while at the same time not decreasing its sealing efficiency.

A further object of my invention is to provide a portion of the peripheral surface of a yieldable sealing cup with an expansible ring of plastic material to thereby produce a sealing means wherein the friction and wear between the surface of the cup and the cylinder is reduced a substantial degree and consequently the efficiency increased.

Another object of my invention is to produce a sealing cup which will not be subject to being cut or otherwise damaged when the piston and cylinder have relative movement.

Other objects of my invention will become apparent from the following description taken in connection with the accompanying drawings showing several embodiments thereof.

Figure 4:
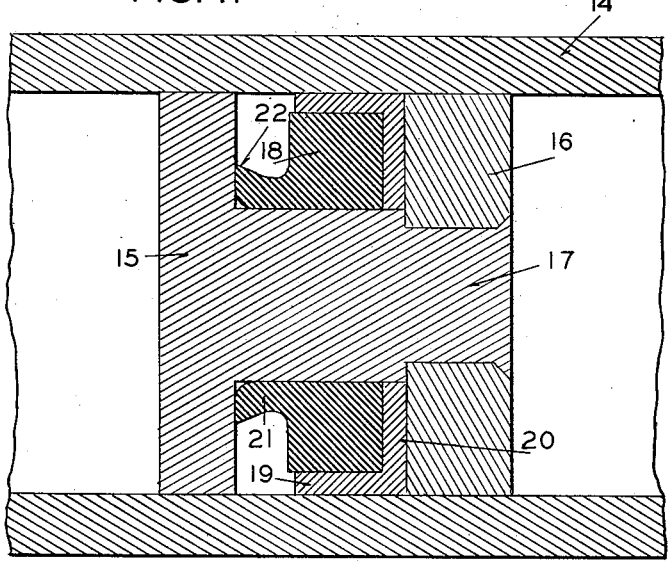
Figure 5:
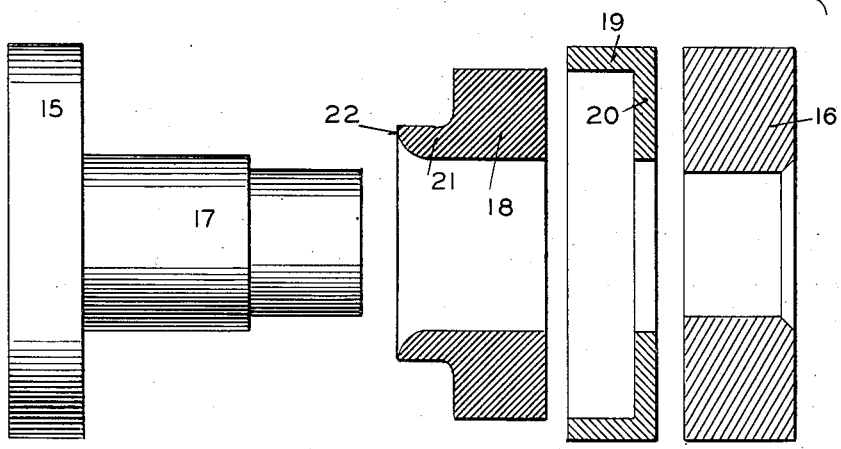

In the drawings, Figure 1 is a sectional view of a piston and cylinder having associated therewith sealing means embodying my invention; Figure 2 is a view of the cup member of the sealing means which is made of rubber or like material and moulded to the form shown; Figure 3 is a sectional view similar to Figure 1 showing a modified construction; Figure 4 is a sectional view showing my invention embodied in a sealing means for a "spool" type piston; and Figure 5 is a view of the piston and sealing means of Figure 4 showing the parts prior to assembly.

Referring in detail to Figures 1 and 2, numeral 1 indicates a cylinder in which is mounted a piston 2, both having good anti-friction properties. The piston is provided with a piston rod 3 which may be employed to either move the piston to create fluid pressure in the cylinder or to transmit force to another member when fluid under pressure is admitted to the cylinder from a suitable source. Associated with the head of the piston is a moulded cup-shaped member 4 of yieldable material such as rubber, synthetic rubber or the like. The annular integral lip 5 of this member is made of slightly larger diameter than the cylinder so as to be at all times in contact with the wall of the cylinder when positioned therein and thus insure a seal when fluid is only under static head. The base portion 6 of the cup-shaped member is provided on its rear end with a central integral projection 7 adapted to fit into a central axial bore 8 in the head portion of the piston. The central portion 9 (Figure 2) of the projection 7 is made slightly oversize with respect to the bore 8 in order to insure that the projection will have a snug fit in the bore. In order that the projection may be inserted in the bore without trapping air therein, the rear end of the bore is connected to the external surface of the piston by a small bleed opening 10. This bleed opening is closed by a plug 11 after the projection has been inserted to thus insure that the cup member will be held on the head of the piston. Any force tending to pull the projection out of the bore will create a suction in the inner end of the bore, thus holding it therein.

The diameter of the base portion of the cup member is made somewhat less than the diameter of the lip portion 5 as best shown in Figure 2 and mounted upon this reduced portion is a ring 12. The inner diameter of this ring is such as to snugly fit on the reduced base portion and the outer diameter is preferably slightly less than the diameter of the cylinder in the drawings the space between the ring and cylinder wall is shown considerably exaggerated). The ring is made of synthetic material which when moulded is resilient so that it can be expanded under pressure. Numerous plastic materials may be used among which are those known under the trade names of "Lucite," "Vinylite" and "Resistoflex." The plastic material, although being resilient, has a relatively hard surface and consequently a relatively low coefficient of friction with the cylinder wall.

With the sealing cup constructed in the manner described and associated with the piston and cylinder wall as shown in Figure 1, the lip 5 of the cup member will always provide a seal to prevent fluid from being forced past the ring and the piston when fluid under pressure is in the chamber ahead of the piston. If the fluid pressure is low, the lip will be the only element of the sealing means in contact with the cylinder wall. The lower pressures will not be great enough to force the material of the lip between the ring and cylinder wall. When the pressure of the fluid ahead of the piston becomes relatively high, the base portion of the cup member, which is subjected to the fluid under pressure, will be displaced radially and will cause the ring 12 to expand into snug engagement with the wall of the cylinder. If the ring 12 were not present and the peripheral portion of the cup member surrounded by the ring were in direct contact with the cylinder wall as is present practice, there would result a considerable friction between the cup member and the surface of the wall which would necessitate the use of substantial force to overcome it. It is thus seen that by the use of the expansible ring having a relatively low coefficient of friction, the surface of the rubber or like readily yieldable material of the sealing means having a relatively high coefficient of friction and which contacts the wall is considerably reduced in area and, therefore, the friction of the sealing means is reduced.

In addition to reducing the friction of the sealing cup under high pressure, the ring also will insure that the normal clearance between the piston and cylinder will be "blocked off", thus preventing any portion of the material of the cup from being extruded into this clearance whereby it will be damaged by "cutting" or "chewing" as a result of the relative movement between the piston and cylinder. The ring 12, due to its expansibility, will always be forced into contact with the cylinder wall prior to the fluid pressure reaching such a value as to cause the lip to be forced into the space between it and the wall.

The modified construction shown in Figure 3 differs from that shown in Figure 1 in that the ring 12' of moulded plastic material is provided with an integral inwardly extending annular flange 13 which lies between the back of the base 6 of the cup and the head surface of the piston. This flange results in greater assurance that the yieldable material of the cup 4 will not be forced in between the ring and the head surface of the piston which may happen with a ring such as 12 when the yieldable cup member 4 is subjected to extremely high fluid pressures. The ring 12' is expansible in the same manner as ring 12 and functions to decrease the friction of the sealing means when high fluid pressures are in the cylinder ahead of the piston. The yieldable cup 4 is of substantially the same form as previously described and is attached to the piston in the same manner. Similar parts are indicated by the same reference numerals employed in Figure 1.

Referring to Figures 4 and 5, there is shown a cylinder 14 in which is reciprocable a "spool" type piston having end members 15 and 16 connected together by a member 17. The sealing means for this type of piston construction is shown as being mounted on the connecting member 17 between the end members. This sealing means comprises an annular yieldable member 18 of rubber or similar material positioned on member 17 and surrounding the body of this yieldable material is a ring 19 made of suitable plastic material and capable of expansion under pressure. An inwardly extending integral flange 20 is also carried by the ring 19 and lies between the body of the yieldable member and the end member 16. In order to effect a seal between the annular yieldable member and the end member 15 so as to prevent fluid from flowing along the connecting member 17, the yieldable member 18 is formed with an annular extension 21 which has a tapered lip 22 for engagement with the rear surface of the end member 15. As best shown in Figure 5, this lip is moulded to extend slightly beyond the main portion of the projection 21 so that when the yieldable member 18 is assembled, it will engage the rear surface of the piston 15 with a slight pressure. Since the expansible ring 19 is the only element of the sealing means associated with the cylinder wall and, therefore, must perform the sealing function at this surface, it is initially moulded to be very slightly greater in diameter than the diameter of the cylinder so that when it is positioned on the piston and the piston is mounted in the cylinder, it will engage the cylinder wall with a slight pressure. The inner diameter of the ring has a snug fit on the body portion of the yieldable member 18.

By means of the construction shown in Figures 4 and 5, it is seen that an effective seal is established for the piston and the cylinder to prevent any fluid from passing the piston. Fluid will flow freely past the clearance between the forward end member 15 and the cylinder wall and be effective on member 18. Due to the contact of ring 19 with the cylinder wall and the contact of lip 22 with the forward end member 22, fluid will be prevented from passing the rear end member 16. When the yieldable member 18 is subjected to substantial fluid pressures, it will force the lip 22 into tighter engagement with the rear surface of the piston 15 and will also act upon and cause the main body of the yieldable member to be displaced radially and expand ring 19 into tighter contact with the cylinder wall. In the construction shown in Figures 4 and 5 there is no part of the yieldable member in contact with the cylinder wall and, therefore, the friction between the sealing means and the cylinder wall will be low due to the low coefficient of friction of the ring. It is seen that even though the high fluid pressures may be acting on the yieldable member, no substantial additional force will be necessary to move the piston to overcome this friction.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. Sealing means for association with a piston and cylinder comprising an unsplit cylindrical ring positioned adjacent the head of the piston for cooperating with the cylinder wall, and a normally uncompressed member positioned within the ring, said ring being made of non-metallic material having a surface the coefficient of friction of which is low with respect to the cylinder wall, and capable of limited expansion by outwardly directed radial pressures, and said member within the ring being made of material readily yieldable as compared with the material of the ring and being exposed to direct contact by fluid in the cylinder whereby when the fluid is placed under pressure said member will be so compressed as to produce a radial force acting on the inner surface of the ring which is sufficient to cause said ring to be expanded and snugly engaged with the cylinder wall.

2. Sealing means for association with a piston and a cylinder comprising an unsplit cylindrical ring for cooperation with a cylinder wall, and being of a molded synthetic material permitting the ring to be radially expanded by an internal radial pressure, and having a surface the coefficient of friction of which is low with respect to the cylinder wall, and a normally uncompressed member positioned within the ring and exposed to direct contact by fluid in the cylinder, whereby said fluid when placed under pressure will cause said member to apply a sufficient radial pressure to the inner surface of the ring to cause said ring to be expanded and snugly engage with the cylinder wall, said member being made of relatively yieldable rubber, synthetic rubber, or the like.

3. Sealing means for association with a piston and a cylinder, comprising a cup of rubber or like yieldable material formed with an integral base portion of an external diameter less than the inner diameter of the cylinder within which it is positioned, and with an integral lip portion of an external diameter to constantly engage the wall of said cylinder, and an unsplit cylindrical ring surrounding the base portion of the cup, said ring being of a material having an external surface the coefficient of friction of which with the cylinder wall is less than the yieldable material of the cup, and being capable of expansion by radial pressures transmitted by the base portion of the cup when under pressure by fluid in the cylinder.

4. Sealing means for association with a cylinder and a piston capable of relative movement, said means comprising an unsplit ring of molded synthetic material capable of radial expansion, the external surface of which has a low coefficient of friction with respect to the cylinder wall, said ring having an outer diameter substantially the same as the inner diameter of the cylinder, and a member of yieldable rubber or like material having a portion lying within the ring for engagement with the inner surface thereof, and another portion positioned forwardly of the ring and constantly engaging the cylinder wall, said last named member being subject to the fluid pressure in the cylinder.

5. Sealing means for mounting on a piston provided with an annular groove, said means comprising an unsplit ring the outer surface of which has a low coefficient of friction, and being capable of limited expansion by radial pressures applied to the inner surface thereof, and an annular member of relatively yieldable material positioned within the ring and engaging the bottom of the annular groove, said annular member also having an annular integral axial extension of considerably less external diameter than the piston, and being provided with a tapered sealing lip on its outer end for engagement with the forward wall of the groove.

6. Sealing means for mounting on a piston provided with an annular groove, said means comprising an unsplit molded ring of synthetic material having an external surface the coefficient of friction of which is lower than rubber, and being capable of limited expansion by the application of radial pressures to its inner surface, and an annular member of yieldable rubber or like material positioned within the ring, and having an annular integral axial extension provided with a tapered sealing lip on its outer end projecting beyond said end, and capable of engaging the forward wall of the groove when said yieldable annular member is positioned in the groove.

BURNS DICK.